United States Patent
Kumagai

(12) 
(10) Patent No.: US 7,567,659 B2
(45) Date of Patent: Jul. 28, 2009

(54) INTERCOM SYSTEM

(75) Inventor: Atsushi Kumagai, Osaka (JP)

(73) Assignee: Funai Electric Co., Ltd. (JP)

( * ) Notice: Subject to any disclaimer, the term of this patent is extended or adjusted under 35 U.S.C. 154(b) by 919 days.

(21) Appl. No.: 11/200,023

(22) Filed: Aug. 10, 2005

(65) Prior Publication Data

US 2006/0035635 A1 Feb. 16, 2006

(30) Foreign Application Priority Data

Aug. 16, 2004 (JP) ............................. 2004-236789

(51) Int. Cl.
*H04M 1/00* (2006.01)
*H04M 1/60* (2006.01)
*H04M 11/04* (2006.01)
(52) U.S. Cl. .................. 379/159; 379/37; 379/167.01
(58) Field of Classification Search .................. 379/15, 379/157, 159, 164, 165, 167.01, 167.04, 379/167.05, 167.11, 167.14, 170, 171, 174, 379/37, 38, 39, 40, 41, 42, 46, 51; 455/404.1; 340/500, 502, 504, 539.1–539.15
See application file for complete search history.

(56) References Cited

U.S. PATENT DOCUMENTS 5,337,342 A * 8/1994 Kruger et al. ................ 379/40
6,765,992 B2 * 7/2004 Dawson ....................... 379/38

FOREIGN PATENT DOCUMENTS

| JP | 2000-299740 | 10/2000 |
|---|---|---|
| JP | 2004-112387 | 4/2004 |

* cited by examiner

*Primary Examiner*—Quoc D Tran
(74) *Attorney, Agent, or Firm*—Bacon & Thomas, PLLC

(57) ABSTRACT

An intercom system is provided which is capable of allowing an emergency notification to be received securely and properly by a contact person, so that upon reception of a call from an emergency-call mobile phone, the call is automatically forwarded to previously determined contacts and transmission/notification processes are performed on the contacts in response to how the contacts respond to the call.

7 Claims, 5 Drawing Sheets

F I G. 1
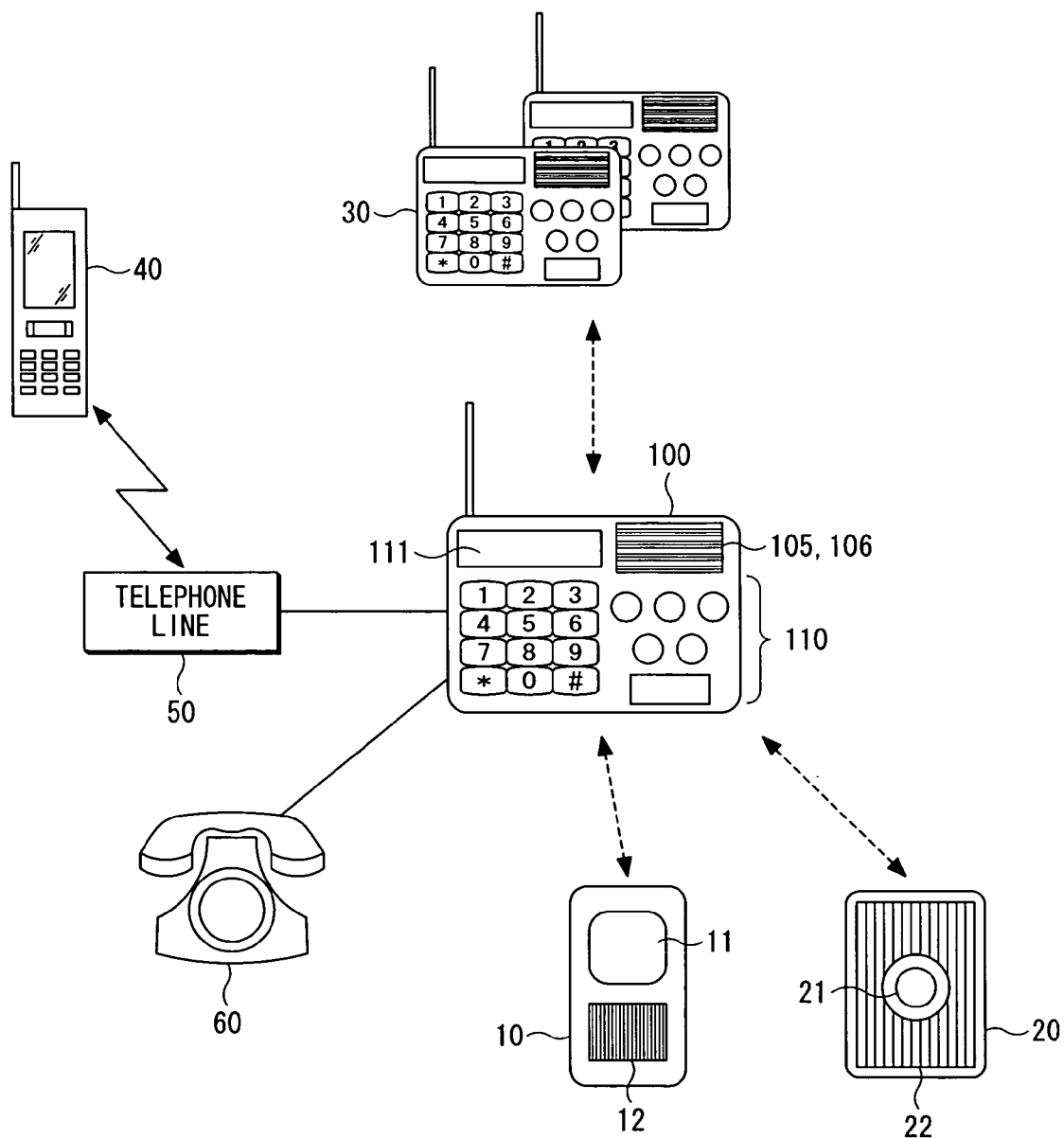

FIG.5

| PRIORITY ORDER | NAME | TELEPHONE NUMBER | NOTIFICATION INFORMATION | INFORMATION INDICATIVE OF THE NUMBER OF NOTIFICATIONS | AUT-ANSWER INFORMATION |
|---|---|---|---|---|---|
| 1 | ○○ | 090-**-** | NOTIFICATION INDICATOR FLAG IS RESET | 0 | I CANNOT ANSWER THE TELEPHONE |
| 2 | △△ | 03-**-** | NOTIFICATION INDICATOR FLAG IS RESET | 0 | I'M NOT IN RIGHT NOW |
| 3 | □□ | 03-**-** | NOTIFICATION INDICATOR FLAG IS RESET | 0 | THIS IS □□ SPEAKING |

INTERCOM SYSTEM

CROSS-REFERENCE TO RELATED APPLICATIONS

This application claims, under 35 USC 119, priority of Japanese Application No. 2004-236789 filed Aug. 16, 2004.

BACKGROUND OF THE INVENTION

1. Field of the Invention

The present invention relates to an intercom system capable of communication with an external terminal device via a communication line, and particularly to an intercom system equipped with an emergency-call mobile phone and operable to automatically transmit a notification to the external terminal device in response to a call from the emergency-call mobile phone.

2. Description of the Related Art

Conventionally, an intercom system comprising a master unit and a plurality of slave units within a residence, a door phone installed, for example, at the entrance has been widely used in a residential application. The intercom system is principally intended to allow mutual communication between terminal devices. For example, in the intercom system, a visitor presses a call button on the door phone to signal a master phone or a slave unit and then the visitor talks to a resident, or residents talk to each other using the master unit and the slave unit.

Further, another intercom system is configured so that for example, a handicapped elderly person uses an emergency-call mobile phone for emergency purposes in his/her own home to call the other terminal device such as a master unit or slave unit when he/she is in an emergency situation, e. g., poor health. The emergency-call mobile phone is very simply configured to only have, for example, a call button and a microphone/speaker and is designed for the purpose of primarily calling a master unit or slave unit, and in this case, the other terminal device is not to be used to call the emergency-call mobile phone.

Moreover, in recent years, still another intercom system has been developed which is operable to receive signals from various sensors and inform a resident of an emergency in response to the signals from said sensors for the purpose of improving security of the resident's home, i. e., which has a function of issuing an alarm in response to fire or gas detection signals output from said sensors.

Patent document 1 suggests a technique for monitoring detection signals output from security sensors and transmitting an alarm signal from an alarm generation unit when it is determined the detection signals indicate an abnormal condition, and then, forwarding the alarm signal to an external terminal device such as a cellular phone, PHS. Further, Patent document 2 suggests a technique for allowing a master unit to inform a previously determined contact (e. g., an external terminal device such as a cellular phone) of an emergency in the event an abnormal condition is detected in the voice of a person who records his/her message using a microphone on a master unit or a slave unit.

Additionally, it is also contemplated that a known emergency-call mobile phone is incorporated in the above techniques so that an emergency-call mobile phone is used to call a master unit or slave unit, which in turn transmits a notification, indicating a resident is in an emergency situation (e. g., resident's illness suddenly becomes worse), to the external terminal device.

[Patent Document 1]
Japanese Unexamined Patent Publication No. 2000-299740
[Patent Document 2]
Japanese Unexamined Patent Publication No. 2004-112387

However, according to the above two conventional techniques, the master unit is able to transmit a notification, indicating a resident is in an emergency situation within his/her residence, to the external terminal device and a owner of the external terminal device does not necessarily respond to that notification, i. e., an answering machine message is in some cases returned to the master unit. Moreover, when the owner of the external terminal device is in such a situation that he/she cannot respond to the notification using his/her phone, in some cases, he/she once establishes speech communication with the master unit and then immediately disconnects the communication. Under such a situation, the intercom system determines the notification has been successfully received by the owner of the terminal device. Therefore, in practice, the notification is in some cases not properly received by the owner of the external terminal device.

Moreover, when an answering machine message is returned from the external terminal device, a voice message from the master unit will be recorded on the terminal device and in this case, an emergency message from the master unit is played during the time the answering machine message (e. g., "I'm not in right now. Please leave your name, phone number, and a message at the sound of the beep") is playing back. This would obviously be a problematic situation in which the emergency message is not properly recorded on the telephone answering machine occurs.

In particular, when a call is transmitted from the emergency-call mobile phone, in many cases, a real-emergency situation occurs and therefore an emergency notification should be securely received by the external terminal device. Further, even in a case where the emergency message is recorded on the telephone answering machine, it is recommended that the resident of interest is able to directly contact the owner of the external terminal device.

An object of the invention is to provide an intercom system capable of allowing an emergency notification to be received securely and properly by a contact person, so that upon reception of a call from an emergency-call mobile phone, the call is automatically forwarded to previously determined contacts and transmission/notification processes are performed on the contacts in response to how the contacts respond to the call.

SUMMARY OF THE INVENTION

The invention is intended to solve the abovementioned problems and an intercom system according to the invention comprises: at least a master unit inside a residence, a first slave unit inside a residence, and a second slave unit, the master unit capable of communication with an external terminal device via a communication line, the first slave unit capable of wired or wireless communication with said master unit, the second slave unit capable of wireless communication with said master unit, in which said master unit includes: notification control means for, when said second slave unit makes a call, performing a transmission process so that the call is transmitted over said communication line to previously determined contacts and performing a notification process in response to how said contact responds to the call; answer signal detection means for, after response from said contact, determining whether or not a response from the contact is an answering machine message based on voice information provided by the contact; and storage means capable of at least storing notification information indicating whether or not a notification has been successfully sent to the contact by said notification control means, the notification information associated with said contact, and in which said notification control means is operable to: play back an emergency message after completion of the answering machine message in the event said contact responds to the call and said answer signal detection means determines the response from the contact is the answering machine message, and immediately play back the emergency message while setting an notification indicator flag in a corresponding box in a notification information column, the box associated with said contact, in the event said answer signal detection means determines the response is not the answering machine message; disconnect communication with the contact in the event said contact does not respond for a predetermined time period; and repeat the transmission and notification processes for all of the contacts whose notification indicator flags are not set until the notification indicator flags associated with all of the contacts are set.

In short, the notification indicator flag is set as notification information only when the notification is successfully received by the previously determined contact and then responded directly by the contact, and the transmission/notification processes are repeated until the notification indicator flags associated with all of the contacts are set. In this manner, the transmission/notification processes are again performed even in the event a contact person cannot recognize the call from a resident of interest and the contact person cannot directly respond to the call, thereby increasing the probability of directly contacting the contact person who is positioned near the terminal device of the contact.

Further, the intercom system is configured so that said notification control means establishes speech communication between said slave unit and said contact after playing back the emergency message, in the event said contact responds to the call from the resident. This allows the resident, who has made a call using the second slave unit and is able to talk directly to the contact person, to inform the contact person that the resident is in an emergency situation.

Moreover, said storage means previously stores auto-answer information indicative of the contents of an answering machine message corresponding to said previously determined contact and said answer signal detection means matches the auto-answer information related to each of the contacts and stored in said storage means, and the voice information sent from the contact and contained in the response from the contact against each other, in order to determine whether or not the response from the contact is the answering machine message. This allows the intercom system to use a relatively simple voice recognition technology to determine whether or not the response from the contact is the answering machine message.

Additionally, said storage means previously stores contact priority order information indicative of the order of transmissions from the notification control means to said plurality of previously determined contacts and said notification control means sends a notification based on said contact priority order information so that the notification should take place in contact priority order. This allows the intercom system to send a notification to the plurality of contacts so that the notification should take place in contact priority order, thereby preventing a situation in which the resident is not able to be in direct contact with any of the contact persons.

Moreover, said storage means stores the number of transmissions from said notification control means to each of said plurality of previously determined contacts, and in the event the number of transmissions reaches a predetermined number of times, said notification control means terminates the transmission and notification processes even when the notification indicator flag is not set in the corresponding box in the notification information column. This allows the intercom system to prevent a situation in which the transmission and notification processes are endlessly repeated while contributing to increasing unnecessary communication cost in the event it is reasonably determined that the contact person is clearly not present near the terminal device of the contact.

Preferably, said second slave unit is an emergency-call mobile phone which is operable to allow a user to operate a call button on the phone in order to be able to establish speech communication with said master unit or speech communication with an external terminal device through said master unit and configured not to be able to respond to a call from said master unit. That is, the intercom system is able to adequately address a situation in which a resident is in a serious emergency, i. e., a call is sent from the emergency-call mobile phone.

EFFECTS OF THE INVENTION

According to the invention, whether or not the response from the previously determined contact is the answering machine message is determined by the answer signal detection means, the notification indicator flag is set in the corresponding box in the notification information column only when the contact responds to the call from the resident and the notification is directly received by the contact, and the transmission/notification processes are repeated until the notification indicator flags associated with all of the contacts are set, thereby increasing the probability of communicating directly with the contact person in cases where the contact person is located near the terminal device of the contact. Accordingly, the notification indicating the resident is in an emergency situation can be rapidly and securely received by the previously determined contacts and therefore the probability of preventing an emergency situation occurring in the residence is significantly increased.

Moreover, when the answer signal detection means determines the response from the contact is the answering machine message, the emergency message is played back after completion of the answering machine message. Accordingly, a problematic situation in which the emergency message used to inform an emergency is played back during the time the answering machine message is playing back and is not properly recorded, causing the contact person not to be able to examine the contents of the notification, can be prevented.

BRIEF DESCRIPTION OF THE DRAWINGS

FIG. 1 is an explanatory diagram showing the general configuration of an intercom system according to the embodiment;

FIG. 5 is an implementation of contact information stored in the RAM 108.

DETAILED DESCRIPTION OF THE PREFERRED EMBODIMENTS

Figure 2:
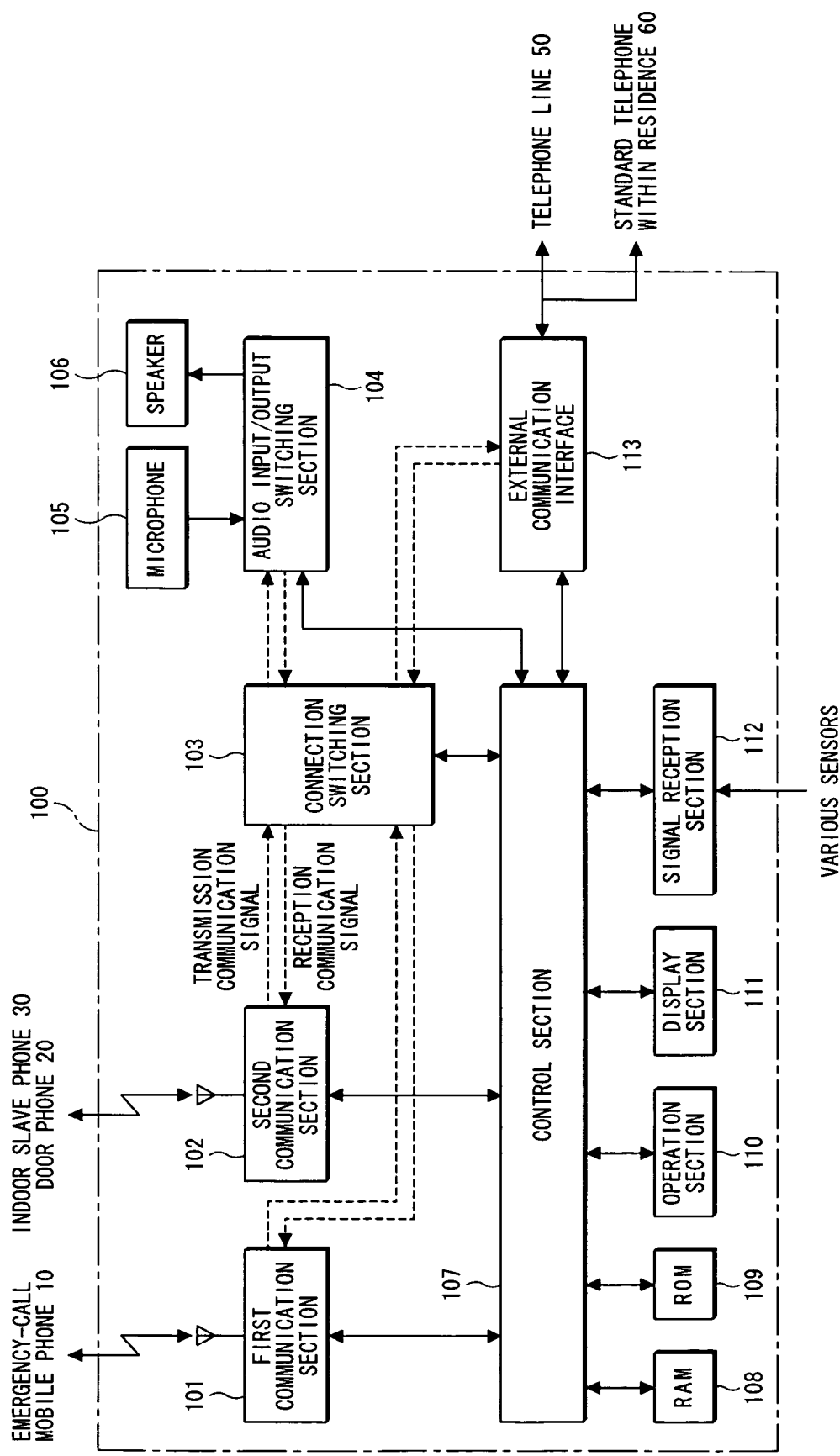
FIG. 2 is a control block diagram of the master unit 100.

A preferred embodiment of the invention will be explained below with reference to the accompanying drawings.

FIG. 1 is an explanatory diagram showing the general configuration of an intercom system according to the embodiment. As shown in FIG. 1, the intercom system of the embodiment comprises an intercom master unit 100, an emergency-call mobile phone 10, a door phone 20, and a plurality of indoor slave phones 30, all of which are wirelessly coupled for mutual communication. Incidentally, the system may be configured to connect the master unit 100 and the door phone 20, indoor slave phone 30 via a wired line.

The master unit 100 comprises a display section 111, a microphone 105, a speaker 106, and an operation section 110, and is operable to respond to a call from the emergency-call mobile phone 10, door phone 20, indoor slave phone 30 and to call the indoor slave phone 30.

More specifically, as shown in a control block diagram of FIG. 2, the master unit 100 comprises: first and second wireless communication units (RF modules) 101, 102 for allowing wireless communication between the emergency-call mobile phone 10, door phone 20 and indoor slave phone 30; a connection switching unit 103 for enabling speech communication between the master unit 100 and the other terminal devices; an audio input/output switching circuit 104 for enabling any one of the microphone 105 and speaker 106; a control section 107 for controlling the individual electronic components based on set-up information input to a RAM 108 or a program stored in a ROM 109; the operation section (including, e. g., numeral buttons) 110 for entry of critical information related to contacts (later described); the display section 111, such as a liquid crystal display device, for a user to confirm the entry of the information; a signal reception section 112 for receiving signals detected by various sensors; and an external communication interface 113 for establishing connection to an external terminal device 40 via a telephone line 50.

The master unit 100 is able to communicate not only by itself with the external terminal device 40 via the telephone line 50 but also by other terminal devices 10, 20 and 30 such as the emergency-call mobile phone 10 to communicate with the external terminal device 40 through the master unit 100. In this case, the master unit 100 and other terminal devices 10, 20, and 30 are not able to respond to a call from the external terminal device 40. That is, a standard telephone 60 connected to a modular jack of the master unit 100 responds to the call from the external terminal device 40.

Incidentally, it is needless to say, the term "external terminal device 40" is intended to include a portable communication terminal device such as a cellular phone and PHS as well as a terminal device (e. g., standard telephone provided within the residence of other individual) capable of communication with the intercom system via the telephone line 50.

The emergency-call mobile phone 10 comprises a call button 11 and microphone/speaker 12 and is used, for example, by an elderly person so that he/she brings the phone with him/her in his/her own residence and calls the master unit or the indoor slave phone 30 to talk to other resident. Further, the door phone 20 comprises a call button 21 and microphone/speaker 22 and is disposed, for example, at an entrance and is used by a visitor to call a resident to talk to the resident. Further, the indoor slave phone 30 has substantially the same configuration as that of the master unit 100, however, is different in that the slave phone 30 cannot communicate by itself with the external terminal device 40 via the telephone line 50. In this case, the slave phone 30 communicates with the external terminal device 40 through the master unit 100.

Moreover, the intercom system of the embodiment operates so that when the call button 11 of the emergency-call mobile phone 10 is pressed, the master unit 100 is called and simultaneously, a notification is transmitted to contacts previously stored in the master unit 100. That is, the emergency-call mobile phone 10 is operated when a handicapped person such as an elder person needs assistance in an emergency and therefore when a call is transmitted from the emergency-call mobile phone 10, an optimum condition should be established for the handicapped person to be able to instantly make contact with some other persons. However, in some cases, a cohabiter is absent and the master unit 100 or the slave phone 30 does not always respond to the call from the handicapped person. Accordingly, the intercom system is configured to transmit a notification to the previously stored contacts external to the residence of the handicapped person in response to any call from the emergency-call mobile phone 10. The previously stored contacts include, for example, the cellular phone number and company phone number of the cohabiter or the phone number of a regular hospital for the handicapped person.

In more detail, when the call button 11 on the emergency-call mobile phone 10 is pressed, the control section 104 of the master unit 100 performs a transmission process by which a call is transmitted via the telephone line 50 to the previously stored contacts and simultaneously performs a notification process by which different notifications are sent to the contacts depending on how the contacts respond to the call (notification control means).

Figure 3:
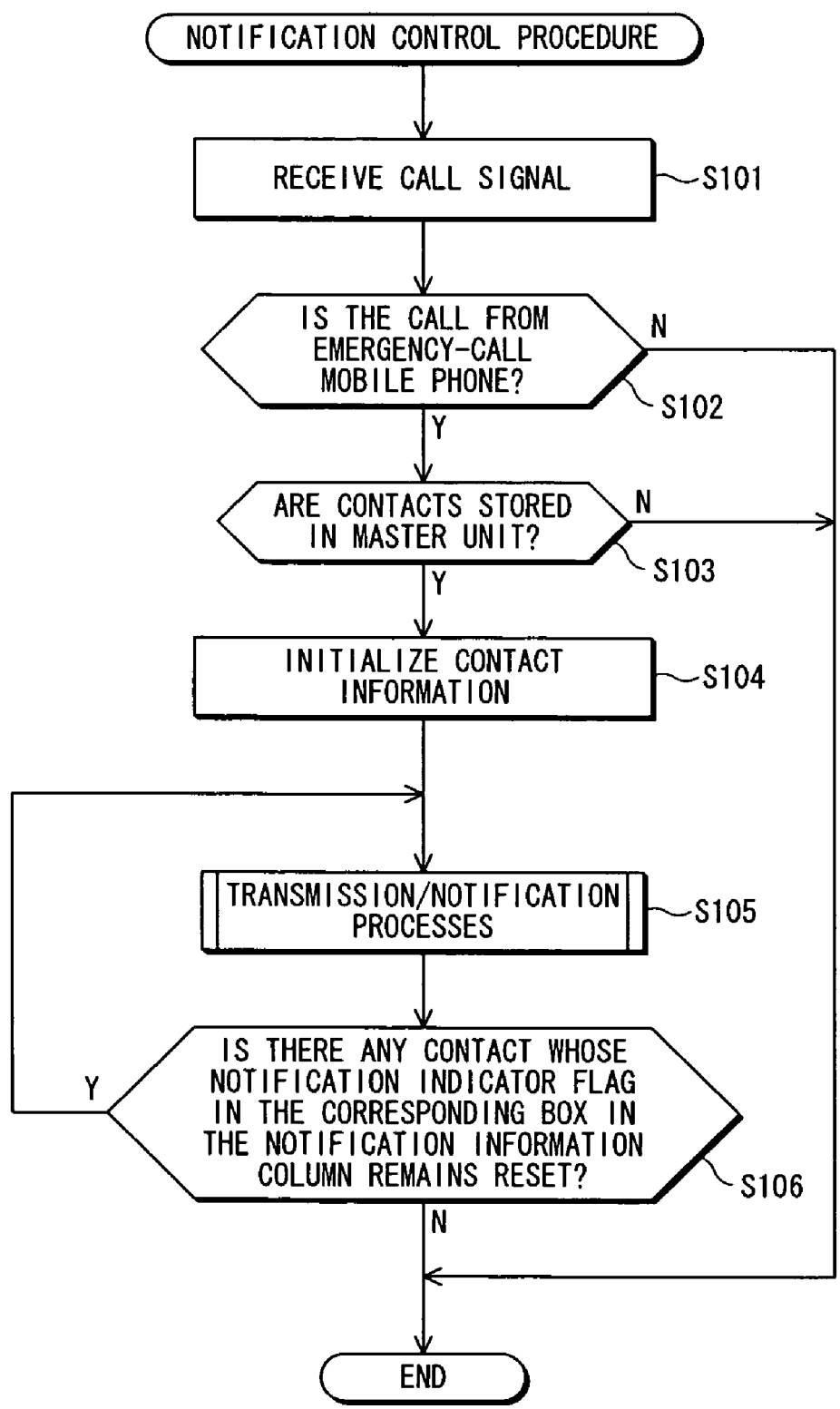
FIG. 3 is a flow chart showing how the notification control means sends the notifications.

FIG. 3 is a flow chart showing how the notification control means sends the notifications (notification control procedure).

First, the control section 107 as notification control means receives a call from any one of the terminal devices (emergency-call mobile phone 10, door phone 20, other slave phones 30) in step S101 and then in step S102, determines whether the call is from the emergency-call mobile phone 10. Thereafter, if this is not the case, the notification control procedure can then end. In this case, only call sound is discharged from the speaker 105 of the master unit 100. On the other hand, if the call is from the emergency-call mobile phone 10, then the procedure proceeds to step S103, in which it is determined whether emergency contacts are being stored in the master unit.

It should be noted that in this embodiment, three contacts are being previously stored and contact information indicative of the stored contacts is stored in the RAM 108, for example, in a form shown in FIG. 5. That is, the contact information consists of contact priority order, contact name, contact phone number, notification indicator, the number of notifications, answering machine message. The contact priority order is the order of transmissions from the notification control means, the notification indicator indicates whether or not the notification control means has sent a notification (whether the contact has been already notified or not yet notified), the number of notifications indicates the number of times the notification control means has performed the transmission process, and the answering machine message is a message sent from the terminal device of the contact and recorded as voice information.

It should be noted that the answering machine message recorded as auto-answer information is prepared, for example, so that a plurality of types of answering machine messages previously recorded on a telephone having auto-answer functionality are stored in the ROM 109 and an answering machine message recorded on the telephone of the contact to be stored is selected from the previously recorded answering machine messages. Alternatively, in a case where the answering machine message from the contact is a message recording the voice of a terminal owner to be contacted, a sender such as a handicapped person or cohabitant previously informs the contact that the contact should respond to a call from the sender with an answering machine message and then the sender automatically records that answering machine message, sent from the contact, as auto-answer information on the master unit 100. In the latter case, each time the contact alters auto-answer information, the sender newly records the altered answering machine message on the master unit.

If Step S103 determines that an emergency contact is not stored in the master unit, the notification control procedure can end and if Step S103 determines that an emergency contact is being stored, the procedure proceeds to step S104, in which the contact information is initialized. In this case, initialization of the contact information involves resetting a notification indicator flag in an information indicator column and setting the number of notifications to "0". In accordance with the notification information indicative of the notification indicator flag and the number of notifications, later-described transmission and notification processes will be repeated.

The notification control procedure proceeds to step S104, in which the contact information is initialized, and then to step S105, in which transmission and notification processes are performed based on the set-up contact information. The transmission and notification processes are outlined using the flow chart shown in FIG. 4.

Figure 4:
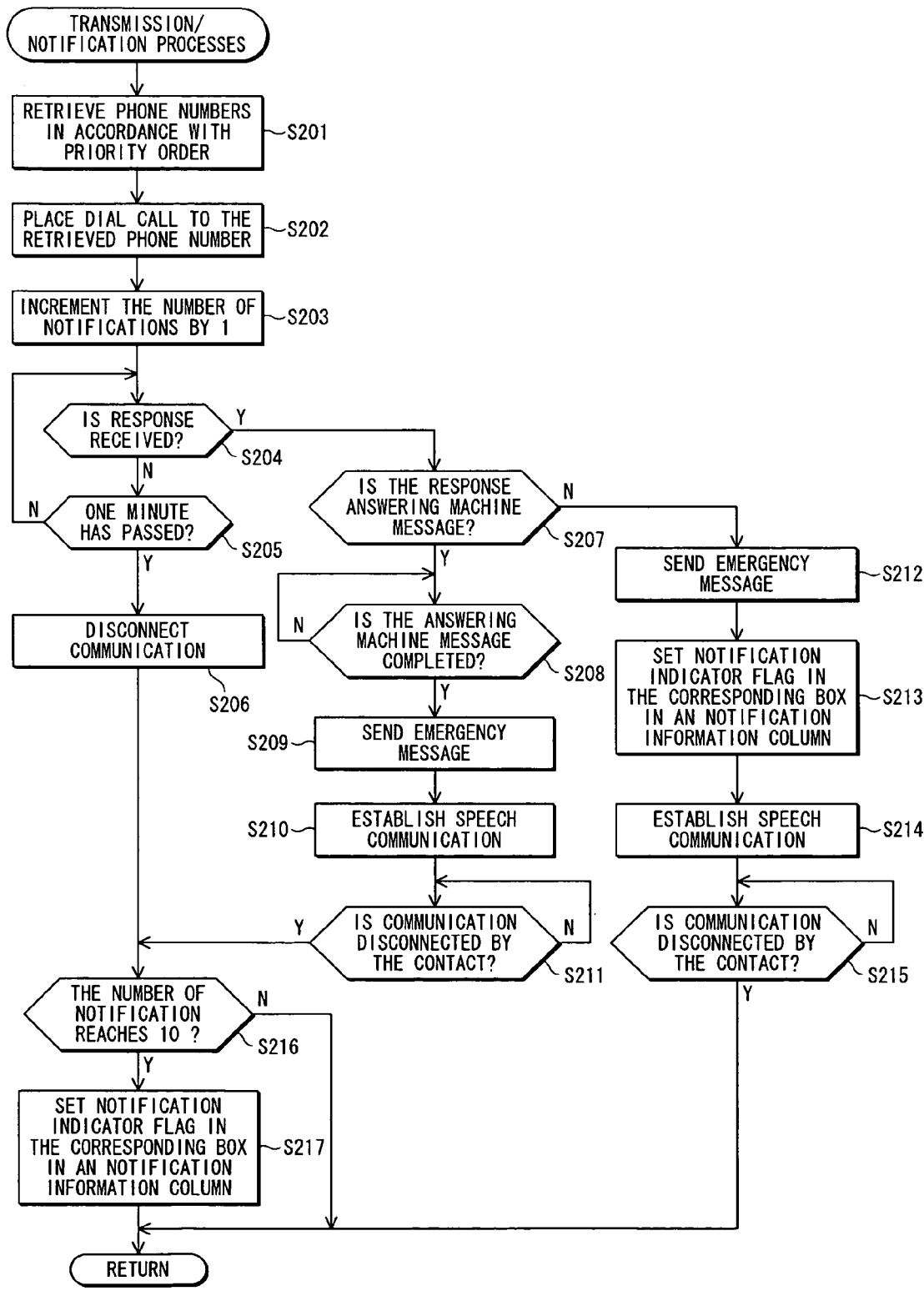
FIG. 4 is a flow chart showing the transmission and notification processes in step S105 of FIG. 3.

As shown in FIG. 4, step S201 retrieves phone numbers of the corresponding contacts in accordance with the contact priority order included in the contact information stored in the RAM 108. For instance, when a contact priority order corresponding to a contact name "○ ○" is "1" as shown in FIG. 5, a phone number "090-***-***" corresponding to the priority number "1" is retrieved. Afterwards, the procedure proceeds to step S202, in which a dial call is placed to the retrieved phone number, and then to step S203, in which the number of notifications corresponding to the contact name "○ ○" is incremented by 1. In short, the number of times the transmission and notification procedures are performed is recorded in the column of the number of notifications.

Then, the procedure proceeds to step S204, in which it is determined whether or not the contact responds to the dial call. For instance, the procedure determines that the contact has responded to the call, i. e., a phone line connection has been established when the pattern for a ring back tone is detected during a ringing call and then the ring back tone is stopped.

Afterwards, when no response is received from the contact in step S204, the procedure proceeds to step S205, in which it is determined whether a predetermined time period has passed (one minute in the embodiment), and if this is the case, the procedure proceeds to step S206, in which the communication is disconnected after expiration of the predetermined time period. Then, the procedure proceeds to step S216, in which it is determined whether the number of notifications reaches 10 and if this is the case, the procedure proceeds to step S217, in which the notification indicator flag is set in the corresponding box in the notification information column, and then the procedure ends, and if the number of notifications does not reach 10, the process can end. In this manner, if the number of notifications reaches a predetermined number of times, it should be allowed to determine the terminal owner is not definitely present around the terminal device of the contact. Such determination prevents transmission and notification processes from being endlessly repeated and eliminates unnecessary communication cost.

On the other hand, if the process determines the response has been received from the contact in step S204, the procedure proceeds to step S207, in which it is determined whether or not the response is the answering machine message from the contact (answer signal detection means). In the embodiment, the answering machine message (auto-answer information) is recorded as one of the contact information and the answering machine message and a voice message sent from the contact are matched against each other, in order to determine whether or not the response is the answering machine message from the contact.

Thereafter, if step S207 determines the response is the answering machine message from the contact, the procedure proceeds to step S208, in which it is determined whether or not the answering machine message has completed, and then to step S209, in which an emergency message (e. g., a message saying "There is an emergency situation") is sent to the contact after completion of the answering machine message. In this case, determination of whether the answering machine message has completed is performed by detection of a particular sound (typically, the "beep" sound following the answering machine message) or by detecting the fact that silence continues for a predetermined time period.

Afterwards, the procedure proceeds to step S210, in which speech communication is established so as to allow the speech communication between the emergency-call mobile phone 10 and the contact, and when the communication is disconnected by the contact in step S211 (typically, in the case of an answering machine message, the telephone line is disconnected after expiration of a predetermined time period), the procedure proceeds to step S216. That is, since there are some cases in which the resident who has placed a call using the emergency-call mobile phone 10 is able to talk over the phone 10, the intercom system is configured to establish speech communication after transmission of an emergency message. Accordingly, the state indicative of how the resident is can be recorded directly on the telephone answering machine and therefore the resident is able to accurately inform the contact of the state of the resident.

Then, the procedure proceeds to step S216, in which it is determined whether the number of notifications reaches 10, and if this is the case, the procedure sets the notification indicator flag and ends in step S217, and if the number of notifications does not reach 10, the procedure can end.

If the procedure determines the response is not the answering machine message from the contact in step S207, the procedure proceeds to step S212, in which an emergency message is immediately sent to the contact, and then to step S213, in which a notification indicator flag is set in the corresponding box in the notification information column. Afterwards, the procedure proceeds to step S214, in which speech communication is established between the emergency-call mobile phone 10 and the contact so as to allow for direct communication therebetween, and when the communication is disconnected by the contact, the process can ends (step S215). This allows the resident to directly inform the contact of how the resident is and therefore the contact person is able to have a better recognition of how the resident is. Further, when the resident is not able to talk over the phone, silence on the line occurs and therefore the contact person is able to assume that an emergency occurs in such a manner that the resident is not able to talk to the contact person over the phone. Incidentally, the intercom system of the embodiment is configured so that to prevent the resident from erroneously operating the emergency-call mobile phone 10 and disconnecting communication, a call from the emergency-call mobile phone 10 cannot be disconnected and the system waits until the communication is disconnected by the contact.

It should be noted that in FIG. 4, if communication is disconnected by the contact from step S204 through step S207 to step S210, or from step S207 through step S212 to step S214, the transmission and notification processes will be forcibly terminated. In this case, in principle, a notification indicator flag remains reset in the corresponding box in the notification information column except that a notification indicator flag is set in the corresponding box in the notification information column in step S213. That is, the system determines that the notification has been successfully received by the contact when the contact is assumed to respond to the call from the resident over the contact telephone and hear the emergency message.

For instance, when the contact person is in such a situation that he/she is not able to respond to the call from the resident (e. g., a ring tone is heard from a cellular phone during conference), the contact person is likely to disconnect the speech communication immediately after the contact person establishes by himself/herself the communication with the resident and therefore the notification indicator flag remains reset, thereby causing the system to again perform the transmission and notification processes. In short, when a call is sent from the emergency-call mobile phone, it could be assumed that a real life emergency occurs and therefore a notification will be repeatedly sent to the previously stored contacts, potentially making the contact person feel discomfort. Even under such situation, the system performs such processing because it is so important for the resident to make direct contact with the contact person.

After performing the transmission and notification processes as described above, the procedure proceeds to step S106 of FIG. 3, in which it is determined whether there is any contact whose notification indicator flag in the corresponding box in the notification information column remains reset and if there is no contact whose notification indicator flag remains reset, the procedure can end.

On the other hand, if step S106 determines there are some contacts whose notification indicator flags remain reset, the procedure proceeds to step S105, in which the transmission and notification processes are repeated. That is, after the transmission and notification processes performed on the contact with contact priority order "1" are completed, the transmission and notification processes are performed on the contact with contact priority order "2" and then the transmission and notification processes are performed on the contact with contact priority order "3". After the transmission and notification processes are performed on all of the contacts in accordance with the contact priority order, the contacts whose notification indicator flags in the corresponding boxes in the notification information column remain reset are selected and the transmission and notification processes are sequentially performed on the selected contacts, in order from highest contact priority to lowest contact priority order. In this case, if the transmission and notification processes are performed on the same contact, the transmission and notification processes are performed when a predetermined time period (e. g., 3 minutes) has passed since the latest transmission and notification processes.

It should be appreciated that when a paging call is broadcast by the emergency-call mobile phone 10, the master unit 100 is called and then performs the above-mentioned transmission and notification processes. Accordingly, it would be possible for another resident to respond using the master unit 100 to the call from the phone 10 during the notification control processes. In this case, speech communication is established between the emergency-call mobile phone 10 and the master unit 100 while the notification control procedure is performed in parallel. Further, when the contact responds to the call from the resident, a party with which the emergency-call mobile phone 10 communicates is switched from the master unit 100 to the contact. Alternatively, the speech communication between the emergency-call mobile phone 10 and the contact may be switched to communication between the master unit 100 and the contact or may be switched to communication between three parties, i. e., the emergency-call mobile phone 10, the master unit 100 and the contact. This allows the resident of interest to more accurately inform the contact of the state of the resident.

As described above, according to the notification control procedure of the embodiment, in a case where the contact does not respond to the call from the resident during a predetermined time period and in a case where it is determined that the response from the contact is an answering machine message, the notification indicator flag in a box located in the notification information column and corresponding to that contact remains reset. On the other hand, in a case where the contact responds to the call within a predetermined time period while it is determined that the response from the contact is not the answering machine message and in a case where the transmission/notification processes are performed 10 times at predetermined time intervals on the same contact, the notification indicator flag in a box located in the notification information column and corresponding to that contact is set.

Moreover, since the transmission/notification processes are is repeatedly performed on all of the contacts until the notification indicator flags corresponding to all of the contacts are set, the probability of direct contact with the contact person who is located near the terminal device of the contact is increased. In this manner, a notification indicating the resident needs assistance in an emergency can be sent rapidly and securely to the previously stored contacts and therefore the probability that an emergency in a residence is prevented significantly increases. Further, when the answer signal detection means determines that the response from the contact is the answering machine message, the emergency message is played back after completion of the answering machine message. Therefore, a problematic situation in which the emergency message used to inform occurrence of an emergency is played back during the time the answering machine message is playing back and is not properly recorded, causing the contact person not to be able to examine the contents of the notification, can be prevented.

Moreover, since a plurality of contacts are previously stored and the transmission/notification processes are sequentially performed in accordance with the contact priority order, a problematic situation in which the resident has no direct contact with any of the contacts can be prevented.

Although in the foregoing description, the invention contemplated by the inventors has been explained in detail in conjunction with the embodiment, the invention is in no way limited to the above embodiment and various modifications may be made without departing from the spirit and scope of the invention.

For example, rather than recording as auto-answer information the answering machine messages corresponding to the contacts, the system is possible to analyze voice data sent from the contact and determine, based on a result of the analysis of voice data, whether or not the response from the contact is the answering machine message. The analysis of voice data can be performed using well known voice recognition technologies. It is also possible to combine a method employed in the above embodiment for determination of whether or not the response from the contact is the answering machine message and the well known voice recognition technologies, in order to analyze voice data. In this case, determination of whether or not the response from the contact is the answering machine message can be more accurately accomplished and in addition, appropriately made even in a case where the answering machine message on the terminal device at the contact is altered.

Additionally, the embodiment involves setting a notification indicator flag in the corresponding box in the notification information column when the number of iterations of the transmission/notification processes reaches 10, in order to simplify determination of presence/absence of the contact to be informed. That is, the transmission/notification processes are repeated to inform the contacts, whose notification indicator flags remain reset, of an emergency until the notification is directly received by all of the contact persons or until the number of iterations of the transmission/notification processes reaches a predetermined number of times (e. g., 10).

What is claimed is:

1. An intercom system comprising:

at least a master unit and an emergency-call mobile phone, the master unit capable of communication with an external terminal device inside a residence via a communication line, the emergency-call mobile phone operable to wirelessly communicate with said master unit and allow a user to use a call button to make a call to said master unit or to an external terminal device through said master unit, the emergency-call mobile phone configured not to be able to respond to a call from said master unit, said master unit including:

notification control means for, when the emergency-call mobile phone makes a call, performing a transmission process so that the call is transmitted over said communication line to a plurality of previously determined contacts and performing a notification process in response to how the contact responds to the call;

answer signal detection means for, after response from said contact, determining whether or not a response from the contact is an answering machine message based on voice information provided by the contact;

storage means for storing contact priority order information indicative of the order of transmissions from said notification control means, notification information indicative of how a notification has been sent to the contact by said notification control means, information indicative of the number of notifications sent by said notification control means, and auto-answer information indicative of contents of an answering machine message, all of the information corresponding to each of said plurality of contacts;

wherein said answer signal detection means determines whether or not a response from the contact is an answering machine message by matching the auto-answer information stored in said storage means and corresponding to each of the contacts and voice information sent as the response from the contact against each other, wherein said notification control means operable to:

send the call to said plurality of contacts based on said contact priority order information so that the notification should take place in priority order;

play back an emergency message after completion of the answering machine message in the event said contact responds to the call and said answer signal detection means determines the response from the contact is the answering machine message, and after playing back the emergency message, establish speech communication between said emergency-call mobile phone and said contact;

immediately play the emergency message while setting an notification indicator flag in a corresponding box in a notification information column, the box associated with said contact, in the event said answer signal detection means determines the response is not the answering machine message, and after playing back the emergency message, establish speech communication between said emergency-call mobile phone and said contact;

disconnect the speech communication in the event said contact does not respond for a predetermined time period; and repeat the transmission and notification processes for all of the contacts whose notification indicator flags are not set until the notification indicator flags associated with all of the contacts are set or the number of transmission and notification processes performed reaches a predetermined number of times.

2. An intercom system comprising:

at least a master unit inside a residence, a first slave unit inside a residence, and a second slave unit, the master unit capable of communication with an external terminal device via a communication line, the first slave unit capable of wired or wireless communication with said master unit, the second slave unit capable of wireless communication with said master unit, said master unit including:

notification control means for, when said second slave unit makes a call, performing a transmission process so that the call is transmitted over said communication line to previously determined contacts and performing a notification process in response to how said contact responds to the call;

answer signal detection means for, after response from said contact, determining whether or not a response from the contact is an answering machine message based on voice information provided by the contact; and storage means capable of at least storing notification information indicating whether or not a notification has been successfully sent to the contact by said notification control means, the notification information associated with said contact;

wherein said notification control means operable to:

play back an emergency message after completion of the answering machine message in the event said contact responds to the call and said answer signal detection means determines the response from the contact is the answering machine message, and immediately play back the emergency message while setting an notification indicator flag in a corresponding box in a notification information column, the box associated with said contact, in the event said answer signal detection means determines the response is not the answering machine message;

disconnect communication with the contact in the event said contact does not respond for a predetermined time period; and repeat the transmission and notification processes for all of the contacts whose notification indicator flags are not set until the notification indicator flags associated with all of the contacts are set.

3. The intercom system according to claim 2, wherein said notification control means establishes speech communication between said slave unit and said contact after playing back the emergency message in the event said contact responds to the call.

4. The intercom system according to claim 2, wherein said storage means previously stores auto-answer information indicative of the contents of an answering machine message corresponding to said previously determined contact and wherein said answer signal detection means matches the auto-answer information related to each of the contacts and stored in said storage means, and the voice information provided by the contact and contained in the response from the contact against each other, in order to determine whether or not the response is an answering machine message.

5. The intercom system according to claim 2, wherein said storage means previously stores contact priority order information indicative of the order of transmissions from the notification control means to said plurality of previously determined contacts, and wherein said notification control means sends a notification based on said contact priority order information so that the notification should take place in priority order.

6. The intercom system according to claim 2, wherein said storage means stores the number of transmissions from said notification control means to said plurality of previously determined contacts, and wherein in the event the number of transmissions reaches a predetermined number of times, said notification control means terminates the transmission and notification processes even when the notification indicator flag is not set in the corresponding box in said notification information column.

7. The intercom system according to claim 2, wherein said second slave unit is operable to allow a user to use a call button to make a call to said master unit or to an external terminal device through said master unit and is an emergency-call mobile phone configured not to be able to respond to a call from said master unit.

* * * * *